US010938595B2

(12) United States Patent
Suyama

(10) Patent No.: US 10,938,595 B2
(45) Date of Patent: Mar. 2, 2021

(54) DEVICE CONTROL SYSTEM, DEVICE CONTROL METHOD, AND NON-TRANSITORY COMPUTER READABLE STORAGE MEDIUM

(71) Applicant: YAMAHA CORPORATION, Hamamatsu (JP)

(72) Inventor: Akihiko Suyama, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 1 day.

(21) Appl. No.: 16/255,259

(22) Filed: Jan. 23, 2019

(65) Prior Publication Data
US 2019/0229945 A1 Jul. 25, 2019

(30) Foreign Application Priority Data

Jan. 24, 2018 (JP) .............................. JP2018-009918

(51) Int. Cl.
H04L 12/28 (2006.01)
G10L 15/30 (2013.01)
(Continued)

(52) U.S. Cl.
CPC .......... H04L 12/2838 (2013.01); G10L 15/22 (2013.01); G10L 15/30 (2013.01); H04L 12/4625 (2013.01); G10L 2015/223 (2013.01)

(58) Field of Classification Search
CPC ......... H04N 21/4227; H04N 21/43615; H04N 5/4403; G06F 16/64; H04L 12/2803;
(Continued)

(56) References Cited

U.S. PATENT DOCUMENTS 5,903,871 A 5/1999 Terui
7,234,115 B1* 6/2007 Sprauve .................. H04L 12/66
715/744
(Continued)

FOREIGN PATENT DOCUMENTS

JP H09288500 A 11/1997
JP 2001128262 A 5/2001
(Continued)

OTHER PUBLICATIONS

Office Action issued in Japanese Appln. No. 2018-558642 dated Jan. 7, 2020. English translation provided.
(Continued)

Primary Examiner — Sargon N Nano
(74) Attorney, Agent, or Firm — Rossi, Kimms & McDowell LLP

(57) ABSTRACT

Provided is a device control system including a server communicates with a first device and a second device. The server is configured to: acquire an operation instruction; transmit a command generated based on the operation instruction to the first device; and control, based on an operation state of the first device, the first device so that the first device communicates with a transmitter of the command in one of a first mode and a second mode. The first device in the first mode performs communication without intervention of the second device. The first device in the second mode performs communication via the second device.

13 Claims, 12 Drawing Sheets

(51) Int. Cl.
*H04L 12/46* (2006.01)
*G10L 15/22* (2006.01)

(58) Field of Classification Search
CPC . H04L 2012/2849; H04L 12/28; H04L 29/06; H04L 12/4625; H04M 2250/74; G10L 15/22; G10L 15/30; G10L 2015/233; G10L 2015/223
See application file for complete search history.

(56) References Cited

U.S. PATENT DOCUMENTS

| | | | |
|---|---|---|---|
| 7,366,498 | B2 | 4/2008 | Ko |
| 7,869,577 | B2 | 1/2011 | Arnison |
| 7,983,399 | B2 | 7/2011 | Arnison |
| 8,438,218 | B2* | 5/2013 | Han ............... H04L 12/2818 709/203 |
| 8,520,807 | B1 | 8/2013 | Hewinson |
| 8,595,319 | B2* | 11/2013 | Hao ............... H04L 67/2842 709/217 |
| 9,220,012 | B1* | 12/2015 | Inamdar ........... H04W 12/08 |
| 9,281,958 | B2* | 3/2016 | Lee ................ H04L 12/2805 |
| 9,479,496 | B2 | 10/2016 | Semba |
| 9,544,310 | B2 | 1/2017 | Gordon |
| 9,892,732 | B1 | 2/2018 | Tian |
| 9,900,730 | B2 | 2/2018 | Kuroda |
| 10,341,336 | B2 | 7/2019 | An |
| 10,623,198 | B2 | 4/2020 | Lin |
| 10,679,608 | B2 | 6/2020 | Mixter |
| 2002/0071577 | A1 | 6/2002 | Lemay et al. |
| 2004/0015573 | A1 | 1/2004 | Yuki |
| 2005/0009498 | A1 | 1/2005 | Ho |
| 2006/0193292 | A1* | 8/2006 | Bansal ............. H04L 47/15 370/331 |
| 2007/0091168 | A1* | 4/2007 | Lee ................ H04L 69/22 348/14.01 |
| 2007/0130337 | A1 | 6/2007 | Arnison |
| 2008/0263654 | A1* | 10/2008 | Bahl ............... H04L 67/2814 726/15 |
| 2010/0083352 | A1 | 4/2010 | Arnison |
| 2010/0328133 | A1* | 12/2010 | Nojima ........... H04N 21/42204 341/176 |
| 2011/0119063 | A1 | 5/2011 | Arnison |
| 2012/0077545 | A1 | 3/2012 | Kim et al. |
| 2012/0206233 | A1* | 8/2012 | Kamiya ........... A61B 6/4283 340/2.1 |
| 2012/0300018 | A1* | 11/2012 | Li ................ H04N 21/43615 348/14.09 |
| 2013/0115927 | A1 | 5/2013 | Gruber |
| 2013/0311180 | A1 | 11/2013 | Arnison |
| 2013/0322634 | A1 | 12/2013 | Bennett |
| 2014/0330560 | A1 | 11/2014 | Venkatesha |
| 2014/0330569 | A1 | 11/2014 | Kolavennu |
| 2014/0351847 | A1 | 11/2014 | Ochiai |
| 2015/0178099 | A1 | 6/2015 | Diester |
| 2015/0215315 | A1 | 7/2015 | Gordon |
| 2015/0348551 | A1 | 12/2015 | Gruber |
| 2015/0379993 | A1 | 12/2015 | Subhojit |
| 2016/0164694 | A1* | 6/2016 | Hyun ............... H04L 65/1069 348/14.08 |
| 2016/0221363 | A1* | 8/2016 | Bae ............... B41J 11/04 |
| 2016/0267913 | A1 | 9/2016 | Kim |
| 2016/0291925 | A1 | 10/2016 | Kohara et al. |
| 2016/0360347 | A1 | 12/2016 | Kuroda |
| 2017/0006026 | A1 | 1/2017 | An |
| 2017/0097618 | A1 | 4/2017 | Cipollo |
| 2017/0111423 | A1 | 4/2017 | Cui |
| 2017/0125035 | A1 | 5/2017 | Gao |
| 2017/0164065 | A1 | 6/2017 | Aggarwal et al. |
| 2017/0230705 | A1 | 8/2017 | Pardue |
| 2017/0264451 | A1 | 9/2017 | Yu |
| 2017/0279949 | A1* | 9/2017 | Takahashi ........... G08B 25/14 |
| 2017/0331807 | A1 | 11/2017 | Mont-Reynaud |
| 2017/0344732 | A1 | 11/2017 | Kohli |
| 2018/0007210 | A1 | 1/2018 | Todasco |
| 2018/0014480 | A1* | 1/2018 | Montgomery ....... G05B 19/042 |
| 2018/0047394 | A1 | 2/2018 | Tian |
| 2018/0048479 | A1 | 2/2018 | Lin |
| 2018/0068663 | A1 | 3/2018 | Choi |
| 2018/0107445 | A1 | 4/2018 | Ohmura |
| 2018/0137858 | A1 | 5/2018 | Saxena |
| 2018/0182399 | A1 | 6/2018 | Suyama |
| 2018/0190264 | A1 | 7/2018 | Mixter |
| 2018/0191670 | A1 | 7/2018 | Suyama |
| 2018/0196630 | A1 | 7/2018 | Kohara et al. |
| 2018/0204575 | A1 | 7/2018 | Huang |
| 2018/0277119 | A1 | 9/2018 | Baba |
| 2018/0332033 | A1 | 11/2018 | Lakhani |
| 2018/0336359 | A1 | 11/2018 | Lakhani |
| 2019/0089550 | A1 | 3/2019 | Rexach |
| 2019/0115017 | A1 | 4/2019 | Sim |
| 2019/0123897 | A1* | 4/2019 | Adams ............... H04L 9/0841 |
| 2019/0173834 | A1 | 6/2019 | Suyama |
| 2019/0259386 | A1 | 8/2019 | Kudurshian |
| 2019/0341033 | A1 | 11/2019 | Hammons |
| 2019/0341037 | A1 | 11/2019 | Bromand |
| 2019/0341038 | A1 | 11/2019 | Bromand |
| 2020/0104094 | A1 | 4/2020 | White |

FOREIGN PATENT DOCUMENTS

| | | |
|---|---|---|
| JP | 2002259114 A | 9/2002 |
| JP | 2004015627 A | 1/2004 |
| JP | 2004507936 A | 3/2004 |
| JP | 2005109763 A | 4/2005 |
| JP | 2015100085 A | 5/2015 |
| JP | 2015106358 A | 6/2015 |

OTHER PUBLICATIONS

Office Action issued in U.S. Appl. No. 16/205,783 dated Jan. 27, 2020.
Office Action issued in U.S. Appl. No. 15/908,379 dated Apr. 8, 2019.
International Search Report issued in Intl. Appln. No. PCT/JP2018/042864 dated Jan. 8, 2019.
Written Opinion issued in Intl. Appln. No. PCT/JP2018/042864 dated Jan. 8, 2019.
English translation of Written Opinion issued in Intl. Appln. No. PCT/JP2016/089215 dated Mar. 28, 2017.
International Preliminary Report on Patentability issued in Intl. Appln. No. PCT/JP2016/089215 dated Jul. 11, 2019. English translation provided.
International Search Report issued in Intl. Appln. No. PCT/JP2016/089215 dated Mar. 28, 2017. English translation provided.
Written Opinion issued in Intl. Appln. No. PCT/JP2016/089215 dated Mar. 28, 2017.
English translation of Written Opinion issued in Intl. Appln. No. PCT/JP2018/042864 dated Jan. 8, 2019.
International Preliminary Report on Patentability issued in Intl. Appln. No. PCT/JP2018/042864 dated Jun. 11, 2020. English translation provided.
Office Action issued in U.S. Appl. No. 16/205,783 dated May 14, 2020.
Notice of Allowance issued in U.S. Appl. No. 15/908,379 dated Aug. 5, 2019.
Office Action issued in U.S. Appl. No. 16/205,783 dated Aug. 19, 2020.

* cited by examiner

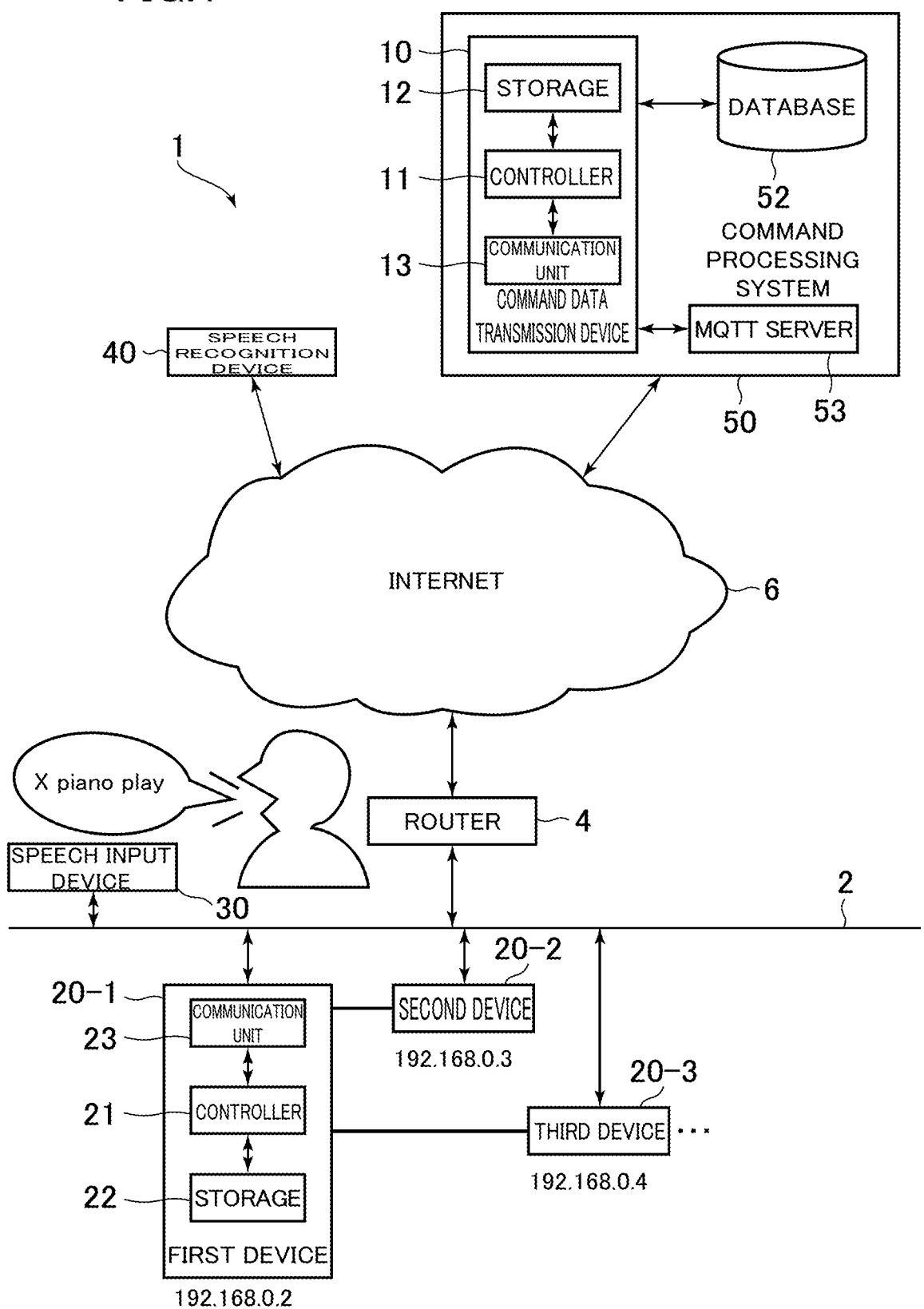

FIG.2

USER ID: U2

USER ID: U1

| ID | NAME | DEVICE ID | IP ADDRESS | COMMAND TYPE | TERMINALS | SIGNAL CONNECTION DESTINATION | RECEPTION FUNCTION | CONNECTION STATE | ACCEPTABLE COMMANDS |
|---|---|---|---|---|---|---|---|---|---|
| 1 | Living room (FIRST DEVICE) | aabbccddee11 | 192.168.0.2 | — | AUX HDMI1 HDMI2 HDMI3 | | 1 | 1 | Power Volume Play |
| 3 | TV (SECOND DEVICE) | aabbccddee33 | 192.168.0.3 | — | — | aabbccddee11 HDMI1 | 0 | 0 | Power Volume Mute |
| 4 | Kitchen (THIRD DEVICE) | aabbccddee44 | 192.168.0.4 | — | — | | 0 | 0 | Power Volume Play |
| ⋮ | ⋮ | ⋮ | ⋮ | ⋮ | ⋮ | ⋮ | ⋮ | ⋮ | ⋮ |

FIG.4

```
{
   "type": "cmd",
   "id":1,
   "command": {
      "ip": "192.168.0.2",
      "path": "/ctrl?power=on",
      "method":"GET"
   }
}
```
~D1

```
{
   "type": "cmd",
   "id":5,
   "command": {
      "ip": "192.168.0.4",
      "path": "/ctrl?power=on",
      "method":"GET"
   }
}
```
~D2

FIG.6

| http://192.168.0.2/ctrl?power=on | ~C1 |

| http://192.168.0.2/ctrl?cmd=play | ~C2 |

| http://192.168.0.4/ctrl?power=on | ~C3 |

| http://192.168.0.4/ctrl?cmd=play | ~C4 |

FIG.9

| ID | DEVICE ID | MESSAGE TRANSMISSION DATE AND TIME | COMMAND |
|---|---|---|---|
| 1 | aabbccddee11 | 2017/12/15 7:00 | Power on |
| 2 | aabbccddee11 | 2017/12 15 7:30 | Play |
| 3 | aabbccddee44 | 2017/12 15 7:30 | Power on |

DEVICE CONTROL SYSTEM, DEVICE CONTROL METHOD, AND NON-TRANSITORY COMPUTER READABLE STORAGE MEDIUM

CROSS-REFERENCE TO RELATED APPLICATION

The present application claims priority from Japanese application JP 2018-009918 filed on Jan. 24, 2018, the content of which is hereby incorporated by reference into this application.

BACKGROUND OF THE INVENTION

1. Field of the Invention

The present invention relates to a device control system, a device control method, and a non-transitory computer readable storage medium.

2. Description of the Related Art

A function of connecting to a network and the like is actively added to home electrical appliances, audio devices, and the like, which are different from general-purpose computer devices, to thereby acquire information from or remotely control those devices. Those devices communicate with a server through the Internet.

In Japanese Patent Application Laid-open No. 2004-15627, there is disclosed a system for remotely controlling audio/visual (AV) devices through a network.

SUMMARY OF THE INVENTION

Data is required to be periodically transmitted and received between the device having the network connection function and the server connected to the device through the network. Consequently, as the number of devices having the network connection function increases, the number of devices directly connected to the server increases, and thus a connection cost may increase.

The present invention has been made in view of the above-mentioned problem, and has an object to provide a technology for suppressing increase in connection cost between devices having a network connection function and a server connected to the devices through a network.

In order to solve the above-mentioned problem, according to one embodiment of the present invention, there is provided a device control system including: operation instruction acquisition means for acquiring an operation instruction; transmission means for transmitting a command generated based on the operation instruction to at least one device; and communication control means for controlling, based on an operation state of one device among the at least one device, the one device so that the one device communicates with the transmission means in one of a first mode of performing communication without intervention of another device and a second mode of performing communication via another device.

Further, according to one embodiment of the present invention, there is provided a device control method including: acquiring an operation instruction; transmitting a command generated based on the operation instruction to at least one device; and controlling, based on an operation state of one device among the at least one device, the one device so that the one device communicates with a transmitter of the command in one of a first mode of performing communication without intervention of another device and a second mode of performing communication via another device.

Further, according to one embodiment of the present invention, there is provided a program for causing a computer to function as: operation instruction acquisition means for acquiring an operation instruction; transmission means for transmitting a command generated based on the operation instruction to at least one device; and communication control means for controlling, based on an operation state of one device among the at least one device, the one device so that the one device communicates with the transmission means in one of a first mode of performing communication without intervention of another device and a second mode of performing communication via another device.

According to the embodiments of the present invention, it is possible to suppress the increase in the connection cost between devices having the network connection function and the server connected to the devices through the network.

BRIEF DESCRIPTION OF THE DRAWINGS

FIG. 1 is a diagram for illustrating a configuration of a device control system according to an embodiment of the present invention.

FIG. 2 is a diagram for illustrating an example of device tables.

FIG. 4 is a diagram for illustrating an example of a message.

FIG. 6 is a diagram for illustrating examples of a retransmission message to be transmitted to a target device.

FIG. 9 is a table for showing an example of a communication log table.

DETAILED DESCRIPTION OF THE INVENTION

Figure 3:
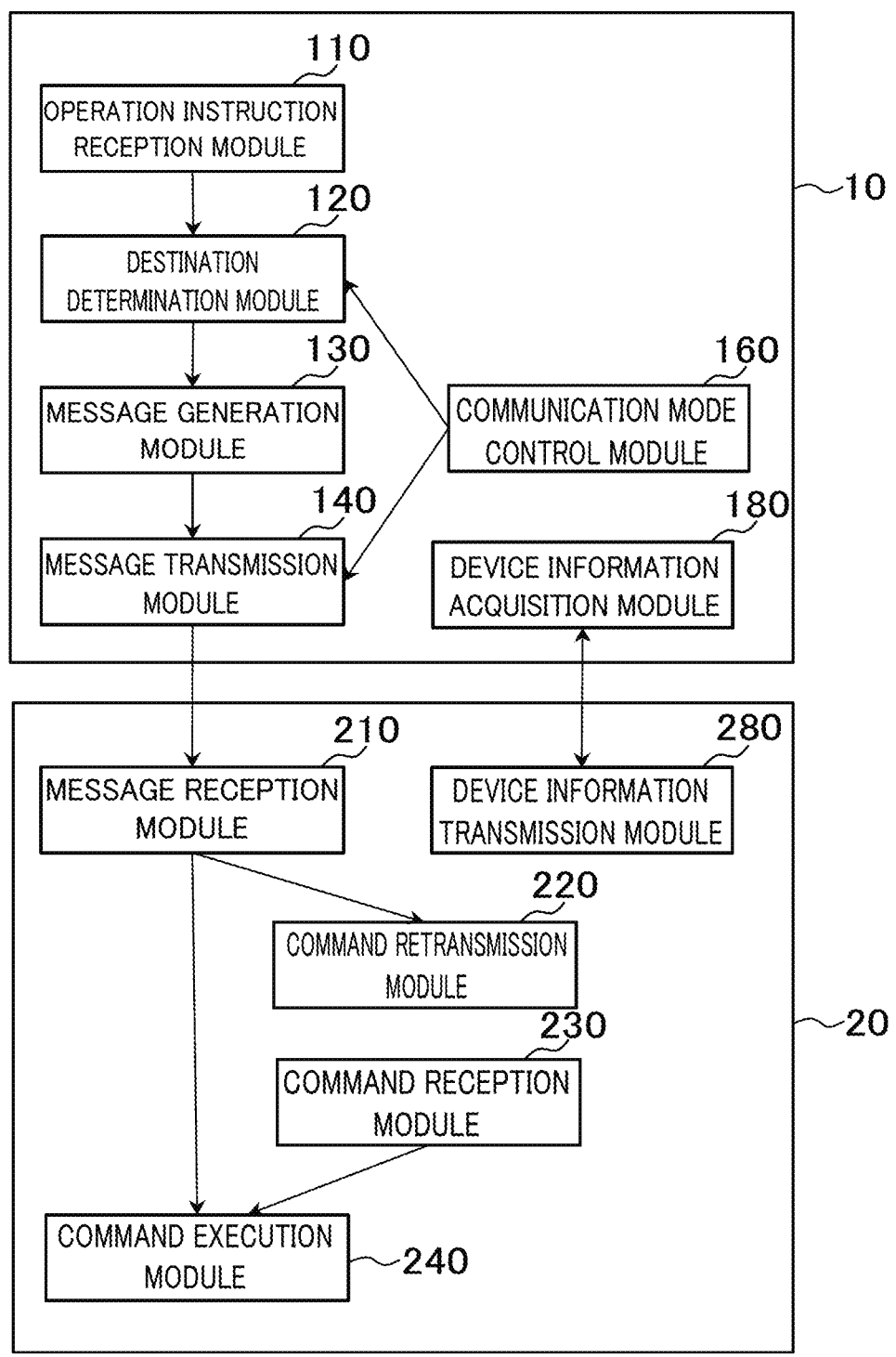
FIG. 3 is a block diagram for illustrating functions implemented by a speech recognition device, a command data transmission device, and a device.

A description is now given of an example of an embodiment of the present invention with reference to the drawings.

[1. System Configuration] FIG. 1 is a diagram for illustrating a configuration of a device control system 1 according to the embodiment of the present invention. As illustrated in FIG. 1, the device control system 1 includes a first device 20-1, a second device 20-2, a third device 20-3, a speech input device 30, a speech recognition device 40, and a command processing system 50. The first device 20-1, the second device 20-2, and the third device 20-3 are hereinafter sometimes generally referred to as "device 20".

The devices 20 and the speech input device 30 are installed in a local area, and are connected to a LAN 2. The LAN 2 may be a wired LAN or a wireless LAN. The LAN 2 is connected to an Internet 6 through a router 4. The speech recognition device 40 and the command processing system 50 are installed outside the local area. In other words, the speech recognition device 40 and the command processing system 50 are installed on the Internet 6 side as viewed from the devices 20 and the speech input device 30. The "local area" is an area having a limited range in which communication through the LAN 2 is available.

The devices 20 are devices 20 to be controlled by the device control system 1. Although the three devices 20 are illustrated in FIG. 1, four or more devices 20 may be included, or only two or less devices 20 may be included. In the following, the devices 20 are assumed to be connected to the same LAN 2.

For example, the device 20 is an audio device or an audio/visual (AV) device. Specifically, the device 20 is an AV receiver, an AV amplifier, a speaker, an optical disc reproduction device (Blu-ray disc (trademark) player, a DVD (trademark) player, or the like), or a television receiver. Moreover, for example, the device 20 may be a musical instrument (an electronic musical instrument, an electric musical instrument, or the like). The device 20 may be a device other than those devices.

In the following, an example in which the first device 20-1 is an AV receiver, the second device 20-2 is a television receiver, and the third device 20-3 is a device installed in another room (kitchen) and including a speaker is assumed. The second device 20-2 is connected to a first high-definition multimedia interface (HDMI) (trademark) terminal (HDMI 1) of the first device 20-1 through an HDMI cable. Moreover, private IP addresses "192.168.0.2", "192.168.0.3", and "192.168.0.4" are set to the first device 20-1, the second device 20-2, and the third device 20-3, respectively.

As illustrated in FIG. 1, the first device 20-1 includes a controller 21, a storage 22, and a communication unit 23. The controller 21 includes at least one microprocessor (CPU), and is configured to carry out processing in accordance with programs stored in the storage 22. The storage 22 includes a main storage (e.g., RAM) and an auxiliary storage (e.g., a nonvolatile semiconductor memory or a hard disk drive). The storage 22 is configured to store programs and data. The communication unit 23 is configured to transmit/receive data to/from other devices. The second device 20-2 and the third device 20-3 also include the controller 21, the storage 22, and the communication unit 23, which are not shown in FIG. 1.

The device 20 may include a component (e.g., an optical disc drive or a memory card slot) configured to read programs and data stored in an information storage medium (e.g., an optical disc or a memory card). Further, the programs may be supplied to the devices 20 through the information storage medium. The programs may be supplied to the devices 20 through the Internet 6.

The speech input device 30 includes a microphone so as to receive speech input. In this embodiment, the speech input device 30 is used by a user for the speech input of an operation instruction to the devices 20. For example, when the user wants to start up the device 20 installed in a living room from a standby state through the command processing system 50 supplied from a company X, the user inputs "AAA, ask MC to turn on the Living Room" or the like to the speech input device 30. In this case, "AAA" is a word (wake word) for starting the speech input to the speech input device 30, and is, for example, a name of the speech input device 30. "MC" is a name of the command processing system 50.

The speech data indicating the speech (phrase) input to the speech input device 30 is transmitted together with a user ID to the speech recognition device 40 through the Internet 6. The speech recognition device 40 is implemented by, for example, a server computer. The speech recognition device 40 may be implemented by a plurality of servers through so-called cloud computing. The speech recognition device 40 is configured to carry out speech recognition processing, to thereby convert the speech data to data in a form easily recognized by a program (command processing system 50). For example, the speech recognition device 40 generates an operation instruction in a predetermined form, which contains character strings indicating a type of instruction by the user and a subject to the instruction, from the speech data on the phrase. Then, the operation instruction is transmitted together with the user ID to the command processing system 50. The user ID may be added by any device (processing) on the Internet 6 side before the speech data is transmitted to the command processing system 50.

Under this state, the speech recognition device 40 is capable of transmitting the operation instruction to a command processing system 50 capable of processing content of the phrase transmitted from the user in accordance with the content of the phrase, for example, a specific word group in the phrase.

As illustrated in FIG. 1, the command processing system 50 includes the command data transmission device 10, a database 52, and a message queueing telemetry transport (MQTT) server 53.

The database 52 stores various types of data. For example, the database 52 stores information on the devices 20 owned by respective users. FIG. 2 is a diagram for illustrating an example of device tables T1 stored in the database 52. The device table T1 is stored for each of the users (while associated with the user ID). The user ID used in the command processing system 50 (database 52) and the devices 20 may be different from or the same as the user ID used in the speech input device 30 and the speech recognition device 40.

As illustrated in FIG. 2, the device table T1 includes fields of "ID", "name", "device ID", "IP address", "command type", "terminals", "signal connection destination", "reception function", "connection state", and "acceptable commands".

The "ID" field indicates information for uniquely identifying each device 20 owned by the user. In FIG. 2, the first device 20-1 corresponds to an ID "1", and the second device 20-2 corresponds to an ID "2".

The "name" field indicates a name of the device 20. This name is used by the user to specify the device 20 subject to the operation instruction. As the name, any name set by the user may be used, or, for example, an initial name set by a manufacturer of the device 20 or the like may be used, and may be modifiable by the user.

The "device ID" field indicates a device ID for solely and uniquely identifying the device 20. The device ID may be a MAC address of the device 20, or an ID generated based on the MAC address. The "IP address" field indicates an IP address set to a wireless or wired network interface card provided for the device 20. The "command type" field is a type (scheme) of commands used in the device 20. The "terminals" field indicates a list of input terminals provided for the device 20. The "signal connection destination" field indicates an input terminal of another device 20 to which the device 20 is connected when the device 20 is connected to the input terminal of the another device 20 and the sound output from the device 20 is input to the another device 20.

The "reception function" field indicates whether the device 20 has a function of receiving a message containing a command through the Internet 6. Detailed description is later made of the message. For example, "0" or "1" is registered in the "reception function" field. "0" indicates that this device 20 does not have a function of receiving a message through the Internet 6. "1" indicates that this device 20 has a function of receiving a message through the Internet 6.

The "connection state" field indicates whether the device 20 and the command processing system 50 can directly communicate with each other. For example, "0" or "1" is registered in the "connection state" field. "0" indicates that this device 20 and the MQTT server 53 of the command processing system 50 are not connected to each other for communication, and this device 20 is not in a state of communicating with the command processing system 50 without intervention of another device 20 (hereinafter also referred to as "state of being not communicably connected"). "1" indicates that this device 20 and the MQTT server 53 of the command processing system 50 are connected to each other for communication, and this device 20 is in the state of communicating with the command processing system 50 without intervention of another device 20 (hereinafter also referred to as "state of being communicably connected"). Detailed description is later made of the communication connection.

The "acceptable commands" field indicates a list of commands that the device 20 can accept. When "Power" is set in the list of the "acceptable commands" field, the field indicates that the device can be started up from the standby state through an external command. Otherwise, the field indicates that the device cannot be started up from the standby state. Moreover, when "Volume" is set in the list of the "acceptable commands" field, the field indicates that a volume of the device can be controlled through an external command. Otherwise, the field indicates that the volume cannot be controlled through an external command.

The data in the device table T1 is registered in the database 52 through input by each user. Data other than the device tables T1 is stored in the database 52. For example, a user and data indicating types of phrases that can be input by the user for the device 20 associated with each other are stored in the database 52. Additionally, data indicating a correspondence between an operation instruction and a command (namely, data for converting the operation instruction to the command) may be stored in the database 52.

The command data transmission device 10 is implemented by, for example, a server computer. As illustrated in FIG. 1, the command data transmission device 10 includes a controller 11, a storage 12, and a communication unit 13. The controller 11, the storage 12, and the communication unit 13 are the same as the controller 21, the storage 22, and the communication unit 23, respectively. The command data transmission device 10 may include a component (e.g., an optical disc drive or a memory card slot) configured to read programs and data stored in an information storage medium (e.g., an optical disc or a memory card). Further, the programs may be supplied to the command data transmission device 10 through the information storage medium. The programs may be supplied to the command data transmission device 10 through the Internet 6.

The command data transmission device 10 can make access to the database 52. The command data transmission device 10 and the database 52 may be implemented by a single server computer, or may be implemented by individual server computers.

The command data transmission device 10 is configured to receive an operation instruction, which is transmitted from the speech recognition device 40 and is directed to the device 20, generate a message containing a command based on the operation instruction, and transmit the message to the device 20. More specifically, the message is transmitted to the device 20 through the MQTT server 53. The message may directly be transmitted to the device 20 subject to the operation instruction through the MQTT server 53, or the message may be transmitted to the target device 20 through another device 20. The MQTT server 53 is configured to transmit/receive data through use of the MQTT protocol. The command data transmission device 10 and the MQTT server 53 may be implemented by a single server computer, or may be implemented by individual server computers.

[2. Functional Blocks] FIG. 3 is a block diagram for illustrating functions implemented by the command data transmission device 10 and the devices 20.

As illustrated in FIG. 3, the command data transmission device 10 includes an operation instruction reception module 110, a destination determination module 120, a message generation module 130, a message transmission module 140, a communication mode control module 160, and a device information acquisition module 180. The operation instruction reception module 110, the destination determination module 120, the message generation module 130, the message transmission module 140, the communication mode control module 160, and the device information acquisition module 180 are implemented by the controller 11 executing programs for the respective functions, which are stored in the storage 12.

Moreover, as illustrated in FIG. 3, the device 20 includes a message reception module 210, a command retransmission module 220, a command reception module 230, a command execution module 240, and a device information transmission module 280. The message reception module 210, the command retransmission module 220, the command reception module 230, the command execution module 240, and the device information transmission module 280 are implemented by the controller 21 executing programs for the respective functions, which are stored in the storage 22.

[2-1] Description is first made of the operation instruction reception module 110, the destination determination module 120, the communication mode control module 160, the message generation module 130, the message transmission module 140, the message reception module 210, the command retransmission module 220, the command reception module 230, and the command execution module 240.

The operation instruction reception module 110 is configured to receive an operation instruction directed to a certain device 20. For example, the operation instruction reception module 110 receives an operation instruction from the speech recognition device 40. The operation instruction is converted by the speech recognition device 40 to data in a form, for example, text data, which is recognizable by a program.

The destination determination module 120 is configured to determine a device 20 (target device) subject to the operation instruction based on the operation instruction, and further determine a device 20 as a transmission destination to which a message generated by the message generation module 130 based on the operation instruction is to be transmitted. The device 20 subject to the operation instruction and the device 20 that is the transmission destination of the message are not always different from each other.

The message generation module 130 is configured to generate, when the operation instruction reception module 110 receives an operation instruction directed to the target device, a message containing a command corresponding to the operation instruction. The command is data, for example, text, for causing an operation to be carried out in accordance with the operation instruction.

FIG. 4 is a diagram for illustrating an example of messages D1 and D2. The message D1 illustrated in FIG. 4 is an example of a message generated when an operation instruction to activate the first device 20-1 from the standby state is received. The message D2 is an example of a message generated when an operation instruction to activate the third device 20-3 from the standby state is received.

The messages D1 and D2 contain items of "type", "id", and "command". The item of "type" indicates a type of the data. In the example illustrated in FIG. 4, "cmd" is set to the item of "type". This indicates that a command is contained in the message. The item of "id" indicates identification information for uniquely identifying the message. Data set to the item of "command" indicates content of the command. The item of "command" contains items of "ip", "path", and "method". The item of "ip" indicates a destination of the command. In the message D1 of FIG. 4, the IP address of the first device 20-1 is set to the item of "ip". In the message D2, the IP address of the third device 20-3 is set to the item of "ip". The item of "path" corresponds to a command main body. The item of "method" indicates a method of the HTTP protocol used when the command main body is transmitted within the LAN 2.

The message transmission module 140 is configured to transmit, to one or a plurality of devices 20, the message generated by the message generation module 130 based on an operation instruction. When the device 20 subject to the operation instruction cannot receive the message through the Internal 6 ("0" is set to the connection state), the message transmission module 140 transmits the message to another device 20, to thereby cause the another device 20 to transfer content of the message to the target device 20.

Figure 5:
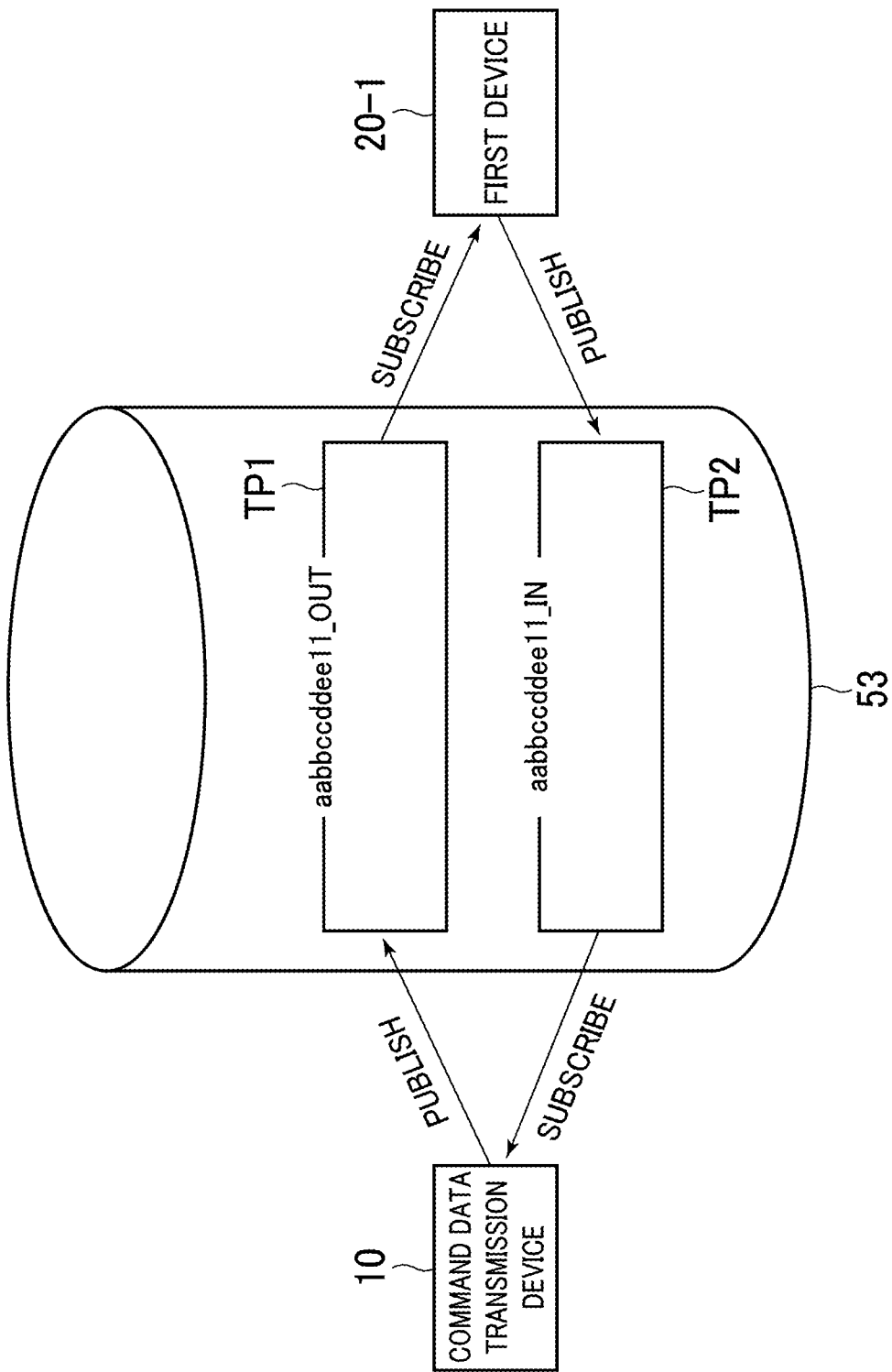
FIG. 5 is a diagram for illustrating communication through an MQTT server.

This message is transmitted to the device 20 through use of the MQTT protocol. In other words, the message transmission module 140 transmits the message to the device 20 through the MQTT server 53. FIG. 5 is a diagram for illustrating communication through the MQTT server 53. FIG. 5 is an illustration of an example of a case in which communication with the first device 20-1 is performed through the MQTT protocol.

As illustrated in FIG. 5, a first topic TP1 is set to the MQTT server 53. The first topic TP1 is a topic to be used to transmit data from the command data transmission device 10 to the first device 20-1. Identification information on the first topic TP1 is set based on a device ID for identifying the device 20. For example, identification information indicating "aabbccddeell_OUT" is set to the first topic TP1. This identification information is formed by combining the device ID of the first device 20-1 and a character string of "OUT" to the effect that this topic is used to transmit data to the first device 20-1 outside the command processing system 50.

Moreover, as illustrated in FIG. 5, a second topic TP2 is also set to the MQTT server 53. The second topic TP2 is a topic to be used to transmit data from the first device 20-1 to the command data transmission device 10. Identification information (name) on the second topic TP2 is also set based on the device ID of the first device 20-1. For example, identification information indicating "aabbccddeell_IN" is set to the second topic TP2. This identification information is formed by combining the device ID of the first device 20-1 and a character string of "IN" to the effect that this topic is used to transmit data to the inside of the command processing system 50.

When the command processing system 50 transmits a message to the first device 20-1, the message transmission module 140 publishes the message to the first topic TP1. The first device 20-1 is registered as a subscriber in the first topic TP1. The message reception module 210 of the first device 20-1 subscribing to the first topic TP1 subscribes to the message published to the first topic TP1. That is, the command data published to the first topic TP1 is transmitted to the first device 20-1. In the manner described above, the command data is transmitted to the first device 20-1 through the first topic TP1. When the first device 20-1 transmits a certain message to the command processing system 50, the device information transmission module 280 of the first device 20-1 publishes the message to the second topic TP2. Moreover, the device information transmission module 280 subscribes to the message published to the second topic TP2.

Moreover, with the MQTT protocol, a communication connection is established through a TCP session between the MQTT server 53 and the device 20, and, in order to maintain this connection, data is transmitted and received every certain period (so-called "keepalive") between the MQTT server 53 and the device 20. When the MQTT protocol is not used, it is conceivable to use so-called polling. Even in this case, transmission/reception is also required to be performed between the command processing system 50 and the device 20 so that an interval from the previous transmission/reception is within a predetermined period. This setting of performing the transmission/reception corresponds to the communication connection in the MQTT protocol. As can be understood from this example, in general, when communication in a push form is performed from the command processing system 50 to the device 20 through the Internet 6, the transmission/reception is required to be repeated even when data to be transmitted and received does not exist. Thus, when the number of connected devices increases, the communication cost increases even without increase in communication amount of messages themselves.

The message reception module 210 is configured to receive a message transmitted from the message transmission module 140 through the Internet 6.

The communication mode control module 160 is configured to control one device 20 (corresponding to a target device) among the one or plurality of devices 20 to perform communication in one of a direct communication mode and an indirect communication mode based on an operation state of the one device 20. In the direct communication mode, the one device 20 communicates with the message transmission module 140 of the command data transmission device 10 without intervention of another device 20. In the indirect communication mode, the one device 20 communicates with the message transmission module 140 via another device 20. More specifically, it is determined whether one of the one or plurality of devices 20 is to be set to the direct communication mode or the indirect communication mode based on the operation state of the one device 20. When it is determined to set the device 20 to the direct communication mode, the device 20 is controlled so that the device 20 and the command processing system 50 are in the state of being communicably connected. When it is determined to set the device 20 to the indirect communication mode, the device 20 is controlled so that the device 20 and the command processing system 50 are in the state of not communicably connected. The operation state is, for example, a transmission state (a frequency or an elapsed period after the last transmission) of a command to the device 20 and a reproduction state of music in the device 20.

When the MQTT protocol is used, in the direct communication mode, a message transmitted from the message transmission module 140 is published to the MQTT server 53, and a target device subscribes to the message from the MQTT server 53, to thereby receive the message. Moreover, in the indirect communication mode, the message transmitted from the message transmission module 140 is published to the MQTT server 53, and the device 20 serving as a transmission destination and different from the target device subscribes to the message from the MQTT server 53. Then, the device 20 serving as the transmission destination transmits to the target device the message or a message obtained by converting the message. The target device receives the transmitted message. The direct communication mode corresponds to a state in which "1" is set to the "connection state" field and the communication connection is established. The indirect communication mode corresponds to a state in which "0" is set to the "connection state" field and the communication connection is not established.

The command retransmission module 220 is configured to transmit a retransmission message to the command reception module 230 of a target device that executes the command. The retransmission message contains a command contained in a message received by the message reception module 210. Information indicating the target device is contained in the message, and the retransmission message is transmitted through, for example, the HTTP protocol. Moreover, the command retransmission module 220 may be configured to transmit the retransmission message when the target device is different from the own device 20, or transmit the retransmission message regardless of the relationship between the target device and the own device 20.

The command reception module 230 is configured to receive a retransmission message transmitted by the command retransmission module 220 of another device 20 or the own device 20. For example, the command reception module 230 receives the retransmission message by the HTTP daemon.

FIG. 6 is a diagram for illustrating examples of the retransmission message to be transmitted to the target device. In the examples of FIG. 6, each of the retransmission messages contains one command. Retransmission messages C1 and C2 illustrated in FIG. 6 are examples of commands directed to the first device 20-1. Retransmission messages C3 and C4 are examples of commands directed to the third device 20-3.

URLs are set as commands to the retransmission messages illustrated in FIG. 6. The retransmission message C1 contains a command to activate the first device 20-1 from a standby state (inactive state). The "standby state" is a state in which consumed power is reduced compared with that in a normal state (active state). That is, the standby state is not a state in which a power supply is completely turned off. Even in the standby state, the network communication function and the like are effective, and the reception of the command data, the execution (transmission) of the command, the reception of the command, and the like are available. The retransmission message C2 contains a command to cause the first device 20-1 to start music reproduction. The retransmission message C3 contains a command to activate the third device 20-3 from the standby state. The retransmission message C4 contains a command to cause the third device 20-3 to start music reproduction. Formats of the commands may be the same or different among the first device 20-1, the second device 20-2, the third device 20-3, and a fourth device 20-4.

The command execution module 240 is configured to execute a command based on the command contained in a message. The command execution module 240 may be configured to directly interpret a command contained in a message received by the message reception module 210, to thereby directly control the device 20. Moreover, the command execution module 240 may be configured to execute a command contained in a retransmission message received by the command reception module 230 from the command retransmission module 220 of another device 20. The command execution module 240 may be configured to execute a command contained in a retransmission message received by the command reception module 230 from the command retransmission module 220 of the own device 20.

[2-2] Description is now made of the device information transmission module 280 and the device information acquisition module 180.

The device information transmission module 280 is configured to transmit, when the operation state of the own device 20 changes, or a certain period has elapsed after the previous transmission, a state message containing current information on this device 20 to the command data transmission device 10 through the Internet 6. The current information is information indicating a current state of the device 20, and contains information indicating whether the device 20 is reproducing music. The state message may further contain model information on the device 20, the name used by a user to identify the device 20, the device ID, and the IP address. The device information transmission module 280 transmits the state message to the command data transmission device 10 through the MQTT server 53.

The device information acquisition module 180 is configured to acquire the state message containing the current information from the device 20. More specifically, the device information acquisition module 180 receives the state message transmitted from the device 20 through the MQTT server 53.

[3. Processing] Description is now made of processing to be carried out by the device control system 1.

Figure 7:
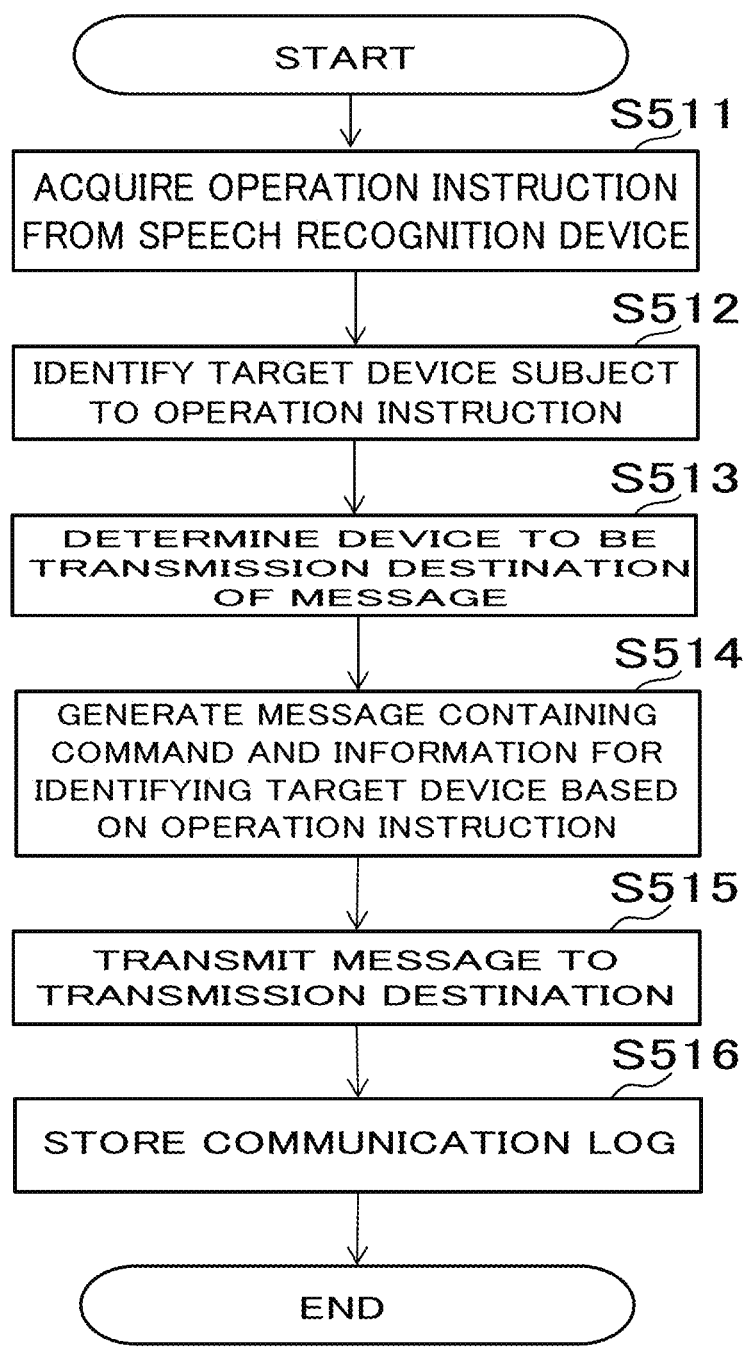
FIG. 7 is a flowchart for illustrating an example of processing by an operation instruction reception module, a destination determination module, a message generation module, and a message transmission module.

[3-1] Description is first made of processing in which the command processing system 50 receives an operation instruction to control the device 20. FIG. 7 is a flowchart for illustrating an example of processing by the operation instruction reception module 110, the destination determination module 120, the message generation module 130, and the message transmission module 140. This processing is carried out by the controller 11 executing programs corresponding to their functions.

First, the operation instruction reception module 110 acquires an operation instruction from the speech recognition device 40 (Step S511). Moreover, the operation instruction reception module 110 identifies a target device subject to the operation instruction (Step S512). Then, the destination determination module 120 determines the device 20 to be a transmission destination of a message based on the operation instruction (Step S513).

Figure 8:
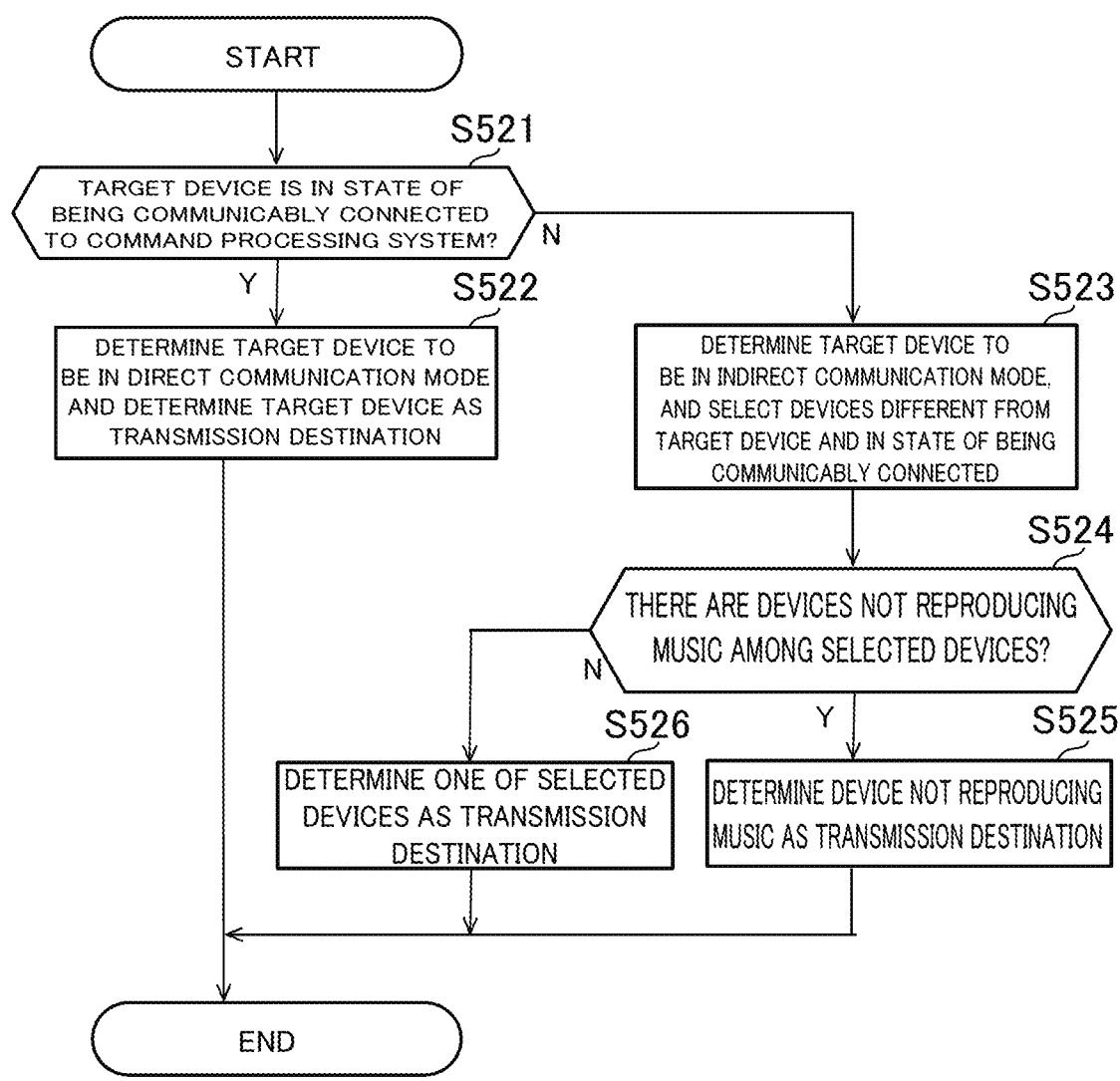
FIG. 8 is a flowchart for illustrating an example of processing by the destination determination module.

FIG. 8 is a flowchart for illustrating an example of processing by the destination determination module 120, and illustrating the processing of Step S513 in more detail. First, the destination determination module 120 determines whether the target device is in the state of being communicably connected to the command processing system 50 (Step S521). Then, when the target device is in the state of being communicably connected (Y in Step S521), the destination determination module 120 determines that the target device is in the direct communication mode, and determines that target device as the transmission destination (Step S522). On the other hand, when the target device is in the state of being not communicably connected (N in Step S521), the destination determination module 120 determines that the target device is in the indirect communication mode, and selects, as candidates, devices 20 that are different from the target device and are in the state of being communicably connected (Step S523).

When the candidates are selected, the destination determination module 120 determines whether there are devices 20 that are not reproducing music among the selected devices 20 (Step S524). The destination determination module 120 determines whether each of the devices 20 is reproducing music by checking whether a reproduction state flag stored in association with the device 20 in the database 52 indicates the music reproduction. Then, when there are devices 20 that are not reproducing music (Y in Step S524), the destination determination module 120 determines one of the devices 20 that is not reproducing music as a transmission destination (Step S525). On the other hand, when there are no devices 20 that are not reproducing music (N in Step S524), the destination determination module 120 determines one of the selected devices 20 as a transmission destination (Step S526). Instead of simply determining whether there are devices 20 that are not reproducing music, the destination determination module 120 may determine whether there are devices 20 that are not streaming music data to other devices 20.

The device 20 reproducing music, specifically, the device 20 streaming music data particularly bears a large processing load, and thus problems including a delay in message-related processing caused by the processing load can be suppressed by the processing of Step S524 and Step S525.

When the device 20 to be the transmission destination is determined, the message generation module 130 generates a message containing a command corresponding to the operation instruction and information for identifying the target device based on the acquired operation instruction (Step S514). The message transmission module 140 transmits the generated message to the device 20 determined as the transmission destination (Step S515), and stores a communication log relating to the transmitted message in a communication log table (Step S516).

FIG. 9 is a table for showing an example of communication logs stored in the communication log table. The communication log table includes a "device ID" field, a "message transmission date and time" field, and a "command" field. A sequence number is set to the "ID" field. A device ID of a target device for executing a command contained in a message is set to the "device ID" field. The "message transmission data and time" field indicates a date and time of a transmission of the message from the message transmission module 140. The "command" field indicates a command contained in the message. The communication logs stored in the communication log table are used in processing by the communication mode control module 160.

Figure 10:
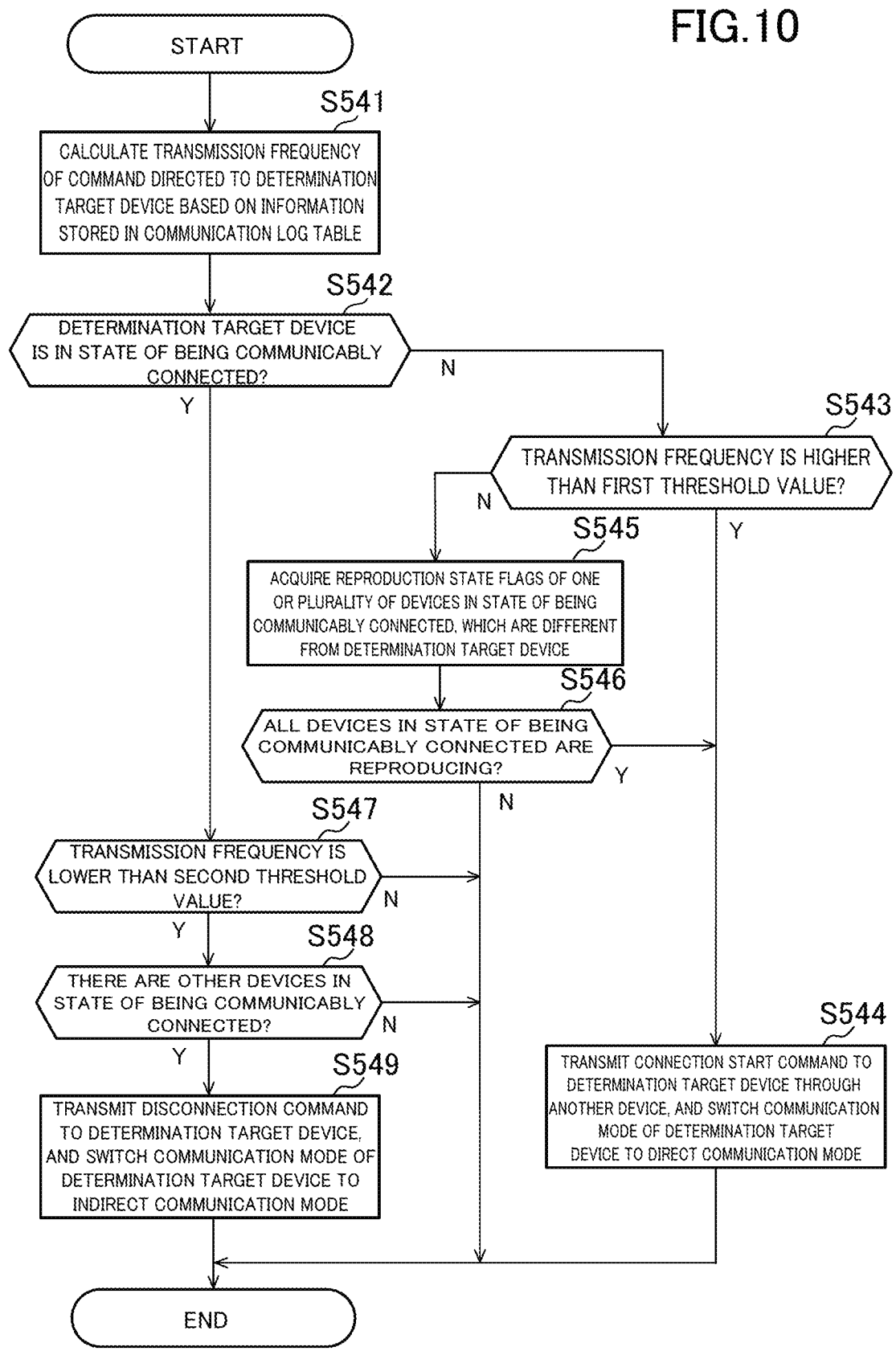
FIG. 10 is a flowchart for illustrating an example of processing by a communication mode control module.

[3-2] Description is now made of control for the communication mode and control for the communication connection of the devices 20. FIG. 10 is a flowchart for illustrating an example of processing by the communication mode control module 160. The processing illustrated in FIG. 10 is carried out, for example, for each of the devices 20 every certain period. The device 20 subject to the processing of FIG. 10 is hereinafter referred to as "determination target device".

First, the communication mode control module 160 calculates a transmission frequency of a command directed to the determination target device based on the information stored in the communication log table (Step S541). For example, the communication mode control module 160 extracts, from the determination log table, communication logs each having a time interval between the message transmission date and time and the current time point shorter than a predetermined value and containing the device ID of the determination target device, and calculates the number of extracted communication logs as the transmission frequency. The communication mode control module 160 may extract communication logs each having a message transmission date and time later than a certain time point before the current time point and containing the device ID of the determination target device. Moreover, the communication mode control module 160 may increment a counter for the device 20 indicated by the device ID of the communication log each time a communication log is stored, and acquire a count of the counter at a time when the processing of Step S541 is carried out as the transmission frequency. In this case, the counter is cleared every certain period.

After the transmission frequency is calculated, the communication mode control module 160 determines whether the determination target device is in the state of being communicably connected based on, for example, the value stored in the "connection state" field of the determination target device in the device table T1 (Step S542). When the determination target device is in the state of being not communicably connected (N in Step S542), the communication mode control module 160 determines whether the transmission frequency is higher than a first threshold value (Step S543). The first threshold value is a threshold value for determining whether a new communication connection is to be added.

When the transmission frequency is higher than the first threshold value (Step S543), the communication mode control module 160 transmits a connection start command to the determination target device through another device 20 (Step S544). After the determination target device enters the state of being communicably connected, the communication mode control module 160 sets "1" to the "connection state" field of the device table T1, to thereby switch the communication mode of the determination target device to the direct communication mode (Step S544). On the other hand, when the transmission frequency is equal to or less than the first threshold value (N in Step S543), the communication mode control module 160 acquires information (reproduction state flag) indicating the reproduction state of each of one or the plurality of devices 20 in the state of being communicably connected, which is different from the determination target device (Step S545). Then, when the reproduction state flags indicate that all the devices 20 in the state of being communicably connected are reproducing music (Y in Step S546), in Step S544, the communication mode control module 160 carries out the processing of switching to the direct communication mode. When the reproduction state flags indicate that any of the devices 20 in the state of being communicably connected are not reproducing music (N in Step S546), the communication mode control module 160 finishes the processing for this determination target device.

On the other hand, when the determination target device is in the state of being communicably connected (Y in Step S542), the communication mode control module 160 determines whether the transmission frequency is lower than a second threshold value (Step S547). The second threshold value is a threshold value for determining whether the communication connection is to be disconnected. In Step S547, an elapsed period after the previous transmission may be used as the transmission frequency. In this case, the communication mode control module 160 determines whether the elapsed period is longer than a threshold value.

When the transmission frequency is equal to or higher than the second threshold value (N in Step S547), the communication mode control module 160 finishes the processing for this determination target device. On the other hand, when the transmission frequency is lower than the second frequency (Y in Step S547), the communication mode control module 160 determines whether there are other devices 20 in the state of being communicably connected (Step S548). In a case where there are no other devices 20 in the state of being communicably connected (N in Step S548), the communication control module 160 finishes the processing so as to prevent a transmitting problem from occurring. The transmitting problem is that a command cannot be transmitted to the devices 20 connected to the LAN 2 to which the determination target device belongs when the determination target device enters the state of being not communicably connected. On the other hand, when there are other devices 20 in the state of being communicably connected (Y in Step S548), the communication mode control module 160 transmits a disconnection command to the determination target device (Step S549). After the communication mode control module 160 confirms that the determination target device has entered the state of being not communicably connected, the communication mode control module 160 sets "0" to the "connection state" field of the device table T1, to thereby switch the communication mode of the determination target device to the indirect communication mode (Step S549).

With the processing illustrated in FIG. 10, the number of communication connections that are formed between the device 20 and the command processing system 50 and through which messages are not transmitted or received decreases, whereas the state in which messages can be transmitted through other devices 20 is maintained. Moreover, communication connections to the devices 20 subject to execution of many commands are established, and communication connections for bypassing the devices 20 each bearing a high load due to the music reproduction and the like are also secured. As a result, it is possible to reduce the connection cost of the communication connections while suppressing occurrence of a state in which commands cannot be transmitted and occurrence of a delay at the time of transmission of commands.

Figure 11:
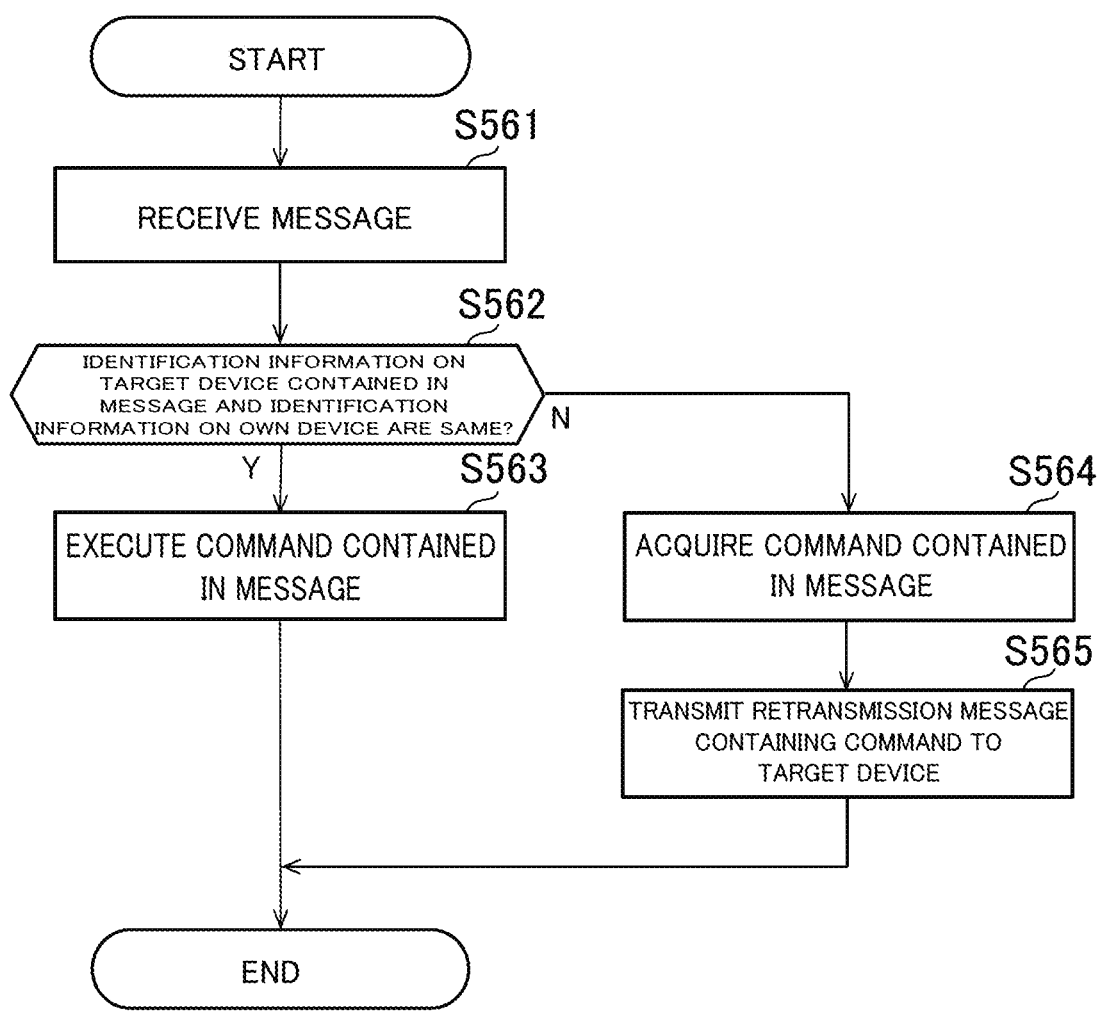
FIG. 11 is a flowchart for illustrating an example of processing by a message reception module, a command retransmission module, and a command execution module.

[3-3] Description is now made of processing in which the device 20 receives a message containing a command from the command processing system 50 to execute the command. FIG. 11 is a flowchart for illustrating an example of processing by the message reception module 210, the command retransmission module 220, and the command execution module 240. The processing carried out by the message reception module 210, the command retransmission module 220, the command reception module 230, and the command execution module 240 is carried out by the controller 21 executing programs corresponding to their functions.

First, the message reception module 210 receives a message transmitted from the command processing system 50 (Step S561). Detailed description of the reception method has already been made, and is thus omitted. Then, the command retransmission module 220 determines whether information (e.g., device ID) for identifying a target device contained in the received message and information for identifying the own device 20 are the same (Step S562). When the identification information contained in the message is the same as the own identification information (Y in Step S562), the command execution module 240 executes a command contained in the message received by the message reception module 210 (Step S563). On the other hand, when the device ID contained in the message is different from the own device ID (N in Step S562), the command retransmission module 220 acquires the command contained in the message (Step S564). Then, the command retransmission module 220 generates a retransmission message containing the command directed to the target device based on the acquired command, and transmits the retransmission message to the target device (Step S565).

Although not shown in FIG. 11, when the retransmission message is transmitted, the command reception module 230 of the target device receives the retransmission message, and the command execution module 240 of the target device executes the command contained in the retransmission message.

In place of the processing of Step S562 and Step S563, the command retransmission module 220 may always transmit the retransmission message to the target device. In this case, the command retransmission module 220 determines whether to transmit (pass) the retransmission message to the command reception module 230 of the own device 20 or to transmit the retransmission message to the command reception module 230 of another device 20 based on information (e.g., IP address) for identifying the transmission destination of the target device. Moreover, the command reception module 230 of the target device receives the retransmission message even when the target device is the own device 20. Accordingly, the command execution module 240 executes the command contained in the retransmission message.

As described above, even when a part of the devices 20 is connected to the command processing system 50, all the devices 20 can be controlled from the command processing system 50 by transmitting a retransmission message to another device 20 based on the device ID of a target device specified in the message received by the device 20.

Figure 12:
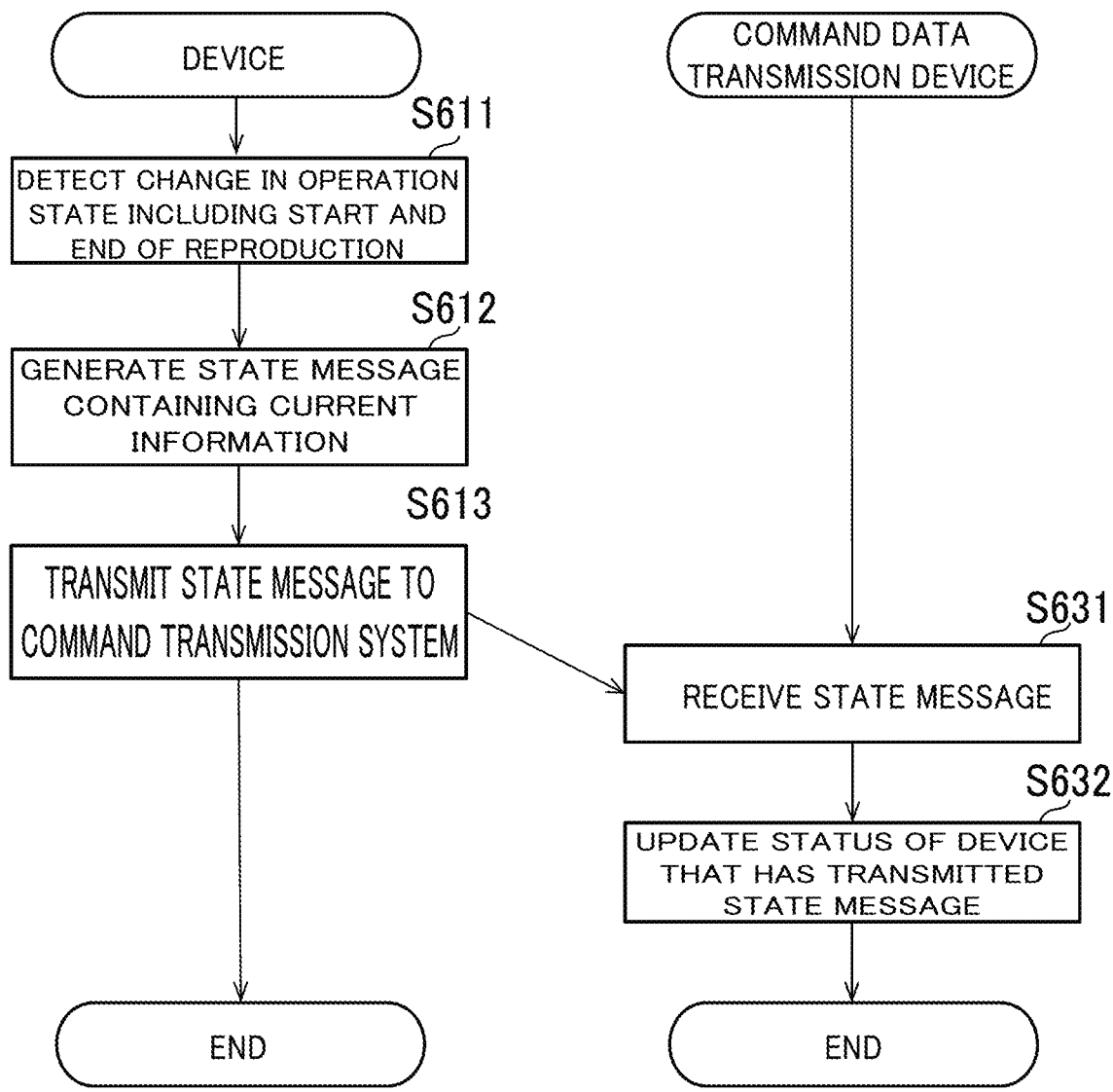
FIG. 12 is a flowchart for illustrating an example of processing of transmitting and receiving a state message.

[3-4] Finally, description is made of processing in which the device information transmission module 280 of the device 20 transmits a state message containing the current information and the device information acquisition module 180 of the command data transmission device 10 receives the state message to update the database 52. FIG. 12 is a flowchart for illustrating an example of processing of transmitting and receiving the state message. Processing carried out by the device 20 in the flowchart of FIG. 12 is carried out by the controller 21 executing a program corresponding to its function. Moreover, processing carried out by the command data transmission device 10 in the flowchart of FIG. 12 is carried out by the controller 11 executing a program corresponding to its function.

First, the device information transmission module 280 detects a change in the operation state of the device 20 (Step S611). The change in the operation state includes a start and end of reproduction in the device 20 and a start and end of streaming of music data to another device 20. When a change in the operation state is detected, the device information transmission module 280 generates a state message containing current information indicating the changed operation state (current state) (Step S612). Then, the device information transmission module 280 transmits the state message to the command data transmission device 10 of the command processing system 50 (Step S613).

The device information acquisition module 180 of the command data transmission device 10 receives the transmitted state message (Step S631). The state message is transmitted and received through use of, for example, the MQTT server 53 as described above. When the device information acquisition module 180 receives the state message, the device information acquisition module 180 updates the status of the device that has transmitted the state message (Step S632). More specifically, the device information acquisition module 180 stores information indicating the current state of the device 20 that has transmitted the state message in the database 52 in association with the device 20 based on the acquired current information.

In the manner described above, the information indicating the current state of the device 20 is transmitted to the command data transmission device 10. As a result, the command data transmission device 10 can manage the information, and the communication mode control module 160 can control the communication mode in accordance with the current state of the device 20.

The communication mode control module 160 may be provided in the device 20. In this case, the processing illustrated in FIG. 10 may be carried out by the devices 20 in the state of being communicably connected to the command processing system 50 among the devices 20. Moreover, in this case, as the communication log to be used to calculate the transmission frequency, logs for reception of messages by the device 20 may be used, and the connection start command may directly be transmitted to a determination target device.

[Supplementary Notes]

As can be understood from the above description of the embodiment, in the present application, a variety of technical ideas including embodiments of the invention described below are disclosed.

There is provided a device control system including: operation instruction acquisition means for acquiring an operation instruction; transmission means for transmitting a command generated based on the operation instruction to at least one device; and communication control means for controlling, based on an operation state of one device among the at least one device, the one device so that the one device communicates with the transmission means in one of a first mode of performing communication without intervention of another device and a second mode of performing communication via another device.

There is provided a device control method including: acquiring an operation instruction; transmitting a command generated based on the operation instruction to at least one device; and controlling, based on an operation state of one device among the at least one device, the one device so that the one device communicates with a transmitter of the command in one of a first mode of performing communication without intervention of another device and a second mode of performing communication via another device.

There is provided a program for causing a computer to function as: operation instruction acquisition means for acquiring an operation instruction; transmission means for transmitting a command generated based on the operation instruction to at least one device; and communication control means for controlling, based on an operation state of one device among the at least one device, the one device so that the one device communicates with the transmission means in one of a first mode of performing communication without intervention of another device and a second mode of performing communication via another device.

In one embodiment of the present invention, the at least one device may be arranged in the same local area network, and the communication control means may be configured to control, based on an operation state of the at least one device, a device other than at least one of the at least one device so that the device performs communication in the second mode.

In one embodiment of the present invention, the communication control means may be configured to transmit, based on the operation state the one device among the at least one device, a command to cause the one device to perform communication in the second mode to the one device.

In one embodiment of the present invention, when the one device among the at least one device performs communication in the second mode, the transmission means may transmit a command directed to the one device performing communication in the second mode to another device performing communication in the first mode.

In one embodiment of the present invention, when the one device among the at least one device performs communication in the second mode, the transmission means may transmit a command directed to the one device performing communication in the second mode to a device performing communication in the first mode and other than a device reproducing music.

In one embodiment of the present invention, the communication control means may be configured to control one device performing communication in the second mode among the at least one device so that the one device performs communication in the first mode, based on an operation state of the one device.

In one embodiment of the present invention, when a command to control a device performing communication in the second mode is transmitted to a device performing communication in the first mode, the communication control means may control the device performing communication in the second mode so that the device performs communication in the first mode.

In one embodiment of the present invention, the communication control means may be configured to control a device performing communication in the second mode so that the device performs communication in the first mode, based on a frequency at which a command directed to the device performing communication in the second mode is transmitted to a device performing communication in the first mode.

In one embodiment of the present invention, when a device performing communication in the first mode is carrying out processing of reproducing music data, the communication control means may control a device other than the device carrying out the processing so that the device performs communication in the first mode.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A device control system, comprising:
a server which communicates with a first device and a second device,
wherein the server comprises at least one processor and at least one memory device that stores a plurality of instructions, which when executed by the at least one processor, causes the at least one processor to operate to:
acquire an operation instruction;
transmit a command generated based on the operation instruction to the first device; and
control, based on an operation state of the first device, the first device so that the first device communicates with the server in one of a direct communication mode and a an indirect communication mode,
wherein, in the direct communication mode, the first device is directly connected to the server and performs direct communication with the server,
wherein, in the indirect communication mode, the first device is directly connected to the second device, which is directly connected to the server, and performs indirect communication with the server via the second device, and
wherein the operation state of the first device includes a transmission frequency of commands directed to the first device, the first device is controlled to communicate with the server in the direct communication mode when the transmission frequency is higher than a predetermined threshold, and the first device is controlled to communicate with the server in the indirect communication mode when the transmission frequency is equal to or lesser than a predetermined threshold.

2. The device control system according to claim 1, further comprising the first device and the second device.

3. The device control system according to claim 1, wherein a connection for communication between the first device and the server is deleted if the indirect communication mode is selected.

4. The device control system according to claim 1, wherein the first device and the second device are arranged in a same local area network.

5. The device control system according to claim 1, wherein the at least one processor in the server transmits, based on the operation state of the first device, a command to cause the first device to perform communication in the indirect communication mode to the first device.

6. The device control system according to claim 1, wherein when the first device performs communication in the indirect communication mode, the at least one processor transmits a command directed to the first device performing communication in the indirect communication mode to the second device performing communication in the direct communication mode.

7. The device control system according to claim 6, wherein when the first device performs communication in the indirect communication mode, the at least one processor transmits a command directed to the first device performing communication in the indirect communication mode to a device performing communication in the direct communication mode and other than a device reproducing music.

8. The device control system according to claim 1, wherein the at least one processor controls one device performing communication in the indirect communication mode among at least one device so that the one device performs communication in the direct communication mode, based on an operation state of the one device.

9. The device control system according to claim 8, wherein when a command to control the first device performing communication in the indirect communication mode is transmitted to the second device performing communication in the direct communication mode, the at least one processor controls the first device performing communication in the indirect communication mode so that the first device performs communication in the direct communication mode.

10. The device control system according to claim 9, wherein the at least one processor controls the first device performing communication in the indirect communication mode so that the first device performs communication in the direct communication mode, based on a frequency at which a command directed to the first device is transmitted to the second device performing communication in the direct communication mode.

11. The device control system according to claim 8, wherein when the second device performing communication in the direct communication mode is carrying out processing of reproducing music data, the at least one processor controls a device other than the second device carrying out the processing so that the device performs communication in the direct communication mode.

12. A device control method, comprising:
acquiring, with at least one processor operating with a memory device in a server, an operation instruction;
transmitting, with the at least one processor operating with the memory device in the server, a command generated based on the operation instruction to a first device; and
controlling, based on an operation state of the first device, the first device so that the first device communicates with the server in one of a direct communication mode and an indirect communication mode,
wherein, in the direct communication mode, the first device is directly connected to the server and performs direct communication with the server,
wherein, in the indirect communication mode, the first device is directly connected to the second device, which is directly connected to the server, and performs indirect communication with the server via the second device, and
wherein the operation state of the first device includes a transmission frequency of commands directed to the first device, the first device is controlled to communicate with the server in the direct communication mode when the transmission frequency is higher than a predetermined threshold, and the first device is controlled to communicate with the server in the indirect communication mode when the transmission frequency is equal to or lesser than a predetermined threshold.

13. A non-transitory computer readable storage medium storing a plurality of instructions, wherein when executed by at least one processor, the plurality of instructions cause the at least one processor to:
acquire an operation instruction;
transmit a command generated based on the operation instruction to a first device; and
control, based on an operation state of the first device, the first device so that the first device communicates with a transmitter of the command in one of a direct communication mode and an indirect communication mode,
wherein, in the direct communication mode, the first device is directly connected to the server and performs direct communication with the server,
wherein, in the indirect communication mode, the first device is directly connected to the second device, which is directly connected to the server, and performs indirect communication with the server via the second device, and wherein the operation state of the first device includes a transmission frequency of commands directed to the first device, the first device is controlled to communicate with the server in the direct communication mode when the transmission frequency is higher than a predetermined threshold, and the first device is controlled to communicate with the server in the indirect communication mode when the transmission frequency is equal to or lesser than a predetermined threshold.

* * * * *